United States Patent
Miura et al.

(10) Patent No.: US 10,135,060 B2
(45) Date of Patent: Nov. 20, 2018

(54) NONAQUEOUS ELECTROLYTE SECONDARY BATTERY AND METHOD OF MANUFACTURING THE SAME

(71) Applicant: TOYOTA JIDOSHA KABUSHIKI KAISHA, Toyota-shi, Aichi-ken (JP)

(72) Inventors: Takashi Miura, Toyota (JP); Masanori Kitayoshi, Toyota (JP); Naohisa Akiyama, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/209,011

(22) Filed: Jul. 13, 2016

(65) Prior Publication Data

US 2017/0018762 A1  Jan. 19, 2017

(30) Foreign Application Priority Data

Jul. 15, 2015 (JP) .................... 2015-141406
Jan. 26, 2016 (JP) .................... 2016-012071

(51) Int. Cl.
| H01M 4/04 | (2006.01) |
| H01M 4/136 | (2010.01) |
| H01M 4/58 | (2010.01) |
| H01M 10/0525 | (2010.01) |
| H01M 10/0585 | (2010.01) |
| H01M 4/62 | (2006.01) |
| H01M 10/058 | (2010.01) |

(52) U.S. Cl.
CPC .......... *H01M 4/0404* (2013.01); *H01M 4/62* (2013.01); *H01M 10/058* (2013.01); *H01M 10/0525* (2013.01)

(58) Field of Classification Search
CPC .......... H01M 10/0525; H01M 10/058; H01M 4/0404; H01M 4/136; H01M 4/58; H01M 4/62
See application file for complete search history.

(56) References Cited

U.S. PATENT DOCUMENTS

| 9,105,939 B2 * | 8/2015 | Matsuyama ........ H01M 4/0404 |
| 2009/0155689 A1 | 6/2009 | Zaghib et al. |
| 2013/0216897 A1 | 8/2013 | Kim et al. |
| 2013/0280610 A1 | 10/2013 | Hwang et al. |
| 2015/0180036 A1 | 6/2015 | Takebayashi |

(Continued)

FOREIGN PATENT DOCUMENTS

| CN | 103493257 A | 1/2014 |
| JP | 2012-531726 A | 12/2012 |
| JP | 2014-103098 A | 6/2014 |

(Continued)

*Primary Examiner* — Brittany L Raymond
(74) *Attorney, Agent, or Firm* — Sughrue Mion, PLLC

(57) ABSTRACT

A method of manufacturing a nonaqueous electrolyte secondary battery includes a positive electrode paste preparation step, a positive electrode sheet preparation step, a construction step, and an initial charging step. In the positive electrode paste preparation step, a positive electrode paste is prepared by dispersing a positive electrode active material, a binder, and a metal phosphate in a solvent. The metal phosphate includes a first metal phosphate and a second metal phosphate having an average particle size which is more than that of the particles of the first metal phosphate by 1.3 μm or more.

5 Claims, 8 Drawing Sheets

(56) References Cited

U.S. PATENT DOCUMENTS

2015/0236347 A1* 8/2015 Jang .................... H01M 4/521
                                                             429/188
2016/0211520 A1   7/2016 Takebayashi

FOREIGN PATENT DOCUMENTS

| JP | 2015-046350 A | 3/2015 |
| JP | 2015-053295 A | 3/2015 |
| JP | 2016197563 A | 11/2016 |
| KR | 10-2015-0014884 A | 2/2015 |

* cited by examiner

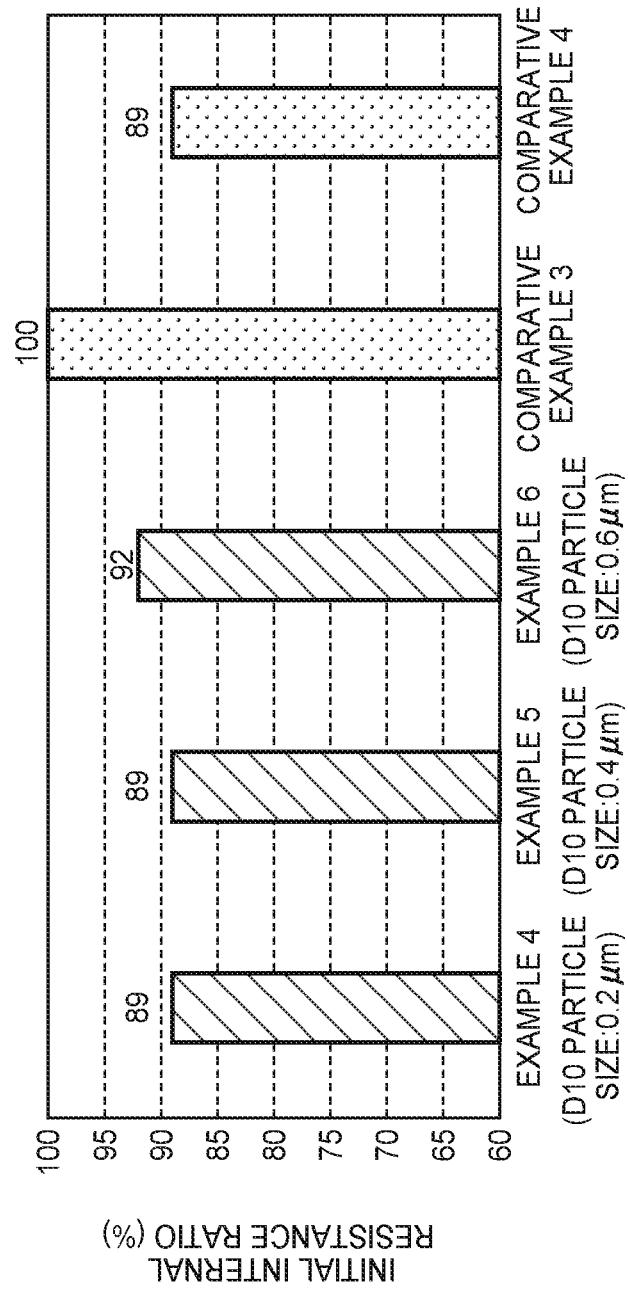

NONAQUEOUS ELECTROLYTE SECONDARY BATTERY AND METHOD OF MANUFACTURING THE SAME

INCORPORATION BY REFERENCE

The disclosure of Japanese Patent Application No. 2015-141406 and 2016-012071 filed on Jul. 15, 2015 and Jan. 26, 2016 including the specification, drawings and abstract is incorporated herein by reference in its entirety.

BACKGROUND OF THE INVENTION

1. Field of the Invention

The present invention relates to a nonaqueous electrolyte secondary battery and a method of manufacturing the same. More specifically, the invention relates to a nonaqueous electrolyte secondary battery containing a high-potential positive electrode active material in a positive electrode active material layer, and a method of manufacturing the same.

2. Description of Related Art

For lithium ion secondary batteries, further improvement of performance such as output or capacity is required. In order to manufacture a high-performance lithium ion secondary battery, a high-potential positive electrode active material such as NiMn spinel has attracted attention. By using a high-potential positive electrode active material, the operating voltage of a lithium ion secondary battery can be increased.

However, in a lithium ion secondary battery manufactured using a high-potential positive electrode active material, an increase in operating voltage may cause the decomposition of an electrolytic solution during charging and discharging. In a lithium ion secondary battery in which an acid is produced by the decomposition of an electrolytic solution, transition metal may be eluted from a positive electrode active material due to the acid. In a case where transition metal is eluted from a positive electrode active material, the capacity retention of a lithium ion secondary battery may decrease.

For example, Japanese Patent Application Publication No. 2014-103098 (JP 2014-103098 A) discloses a nonaqueous electrolyte secondary battery including a positive electrode active material layer that contains a high-potential positive electrode active material and trilithium phosphate ($Li_3PO_4$) as an additive. According to JP 2014-103098 A, by the positive electrode active material layer containing trilithium phosphate, the elution of transition metal from the positive electrode active material during the charging and discharging of the nonaqueous electrolyte secondary battery can be prevented. Specifically, trilithium phosphate can function as an acid consuming material by reacting with hydrofluoric acid (HF) produced in an electrolytic solution. As a result, the elution of transition metal from the positive electrode active material can be suppressed, and the durability of the nonaqueous electrolyte secondary battery can be improved.

Here, in a case where the positive electrode active material layer contains trilithium phosphate as an additive, trilithium phosphate and hydrofluoric acid react with each other in an initial charging step of a lithium ion secondary battery to form a film on a surface of the positive electrode active material. The film is formed on the surface of the positive electrode active material. Therefore, in a case where the film has low conductivity, the internal resistance of a lithium ion secondary battery may increase. It is preferable that the additive such as trilithium phosphate is inexpensive. The reason for this is that, since the manufacturing cost of a positive electrode sheet can be reduced, the manufacturing cost of a battery including the positive electrode sheet can also be reduced.

SUMMARY OF THE INVENTION

The invention provides a nonaqueous electrolyte secondary battery having a reduced manufacturing cost and a low internal resistance, and a method of manufacturing the same.

According to a first aspect of the invention, there is provided a method of manufacturing a nonaqueous electrolyte secondary battery, the nonaqueous electrolyte secondary battery including a positive electrode sheet, a negative electrode sheet, a nonaqueous electrolytic solution which contains an ionic compound having fluorine, and a battery case that accommodates the positive electrode sheet, the negative electrode sheet, and the electrolytic solution, and the positive electrode sheet including a positive electrode current collector foil and a positive electrode active material layer which is formed on a surface of the positive electrode current collector foil. This method includes: a positive electrode paste preparation step of preparing a positive electrode paste by dispersing a positive electrode active material, a binder, and a metal phosphate in a solvent; a positive electrode sheet preparation step of preparing the positive electrode sheet by applying the positive electrode paste to a surface of the positive electrode current collector foil and drying the applied positive electrode paste to form the positive electrode active material layer; a construction step of constructing a nonaqueous electrolyte secondary battery by accommodating the nonaqueous electrolytic solution, the positive electrode sheet, and the negative electrode sheet in the battery case; and an initial charging step of initially charging the nonaqueous electrolyte secondary battery after the construction step. The metal phosphate includes a first group of first metal phosphate particles having a first average particle size and a second group of second metal phosphate particles having a second average particle size which is more than the first average particle size by 1.3 μm or more.

In this method, in an initial charging step, the metal phosphate and hydrofluoric acid react with each other to form a protective film on a surface of the positive electrode active material. In the protective film, as the particle size of the metal phosphate particles decreases, the conductivity is likely to be improved. As the particle size of the metal phosphate decreases, the dispersibility in the positive electrode paste increases. Therefore, the metal phosphate can be uniformly dispersed in the positive electrode active material layer. The reason for this is as follows. By improving the reaction frequency of the metal phosphate with hydrofluoric acid, the reaction can be performed within a short period of time, and the thickness of the protective film formed on the surface of the positive electrode active material can be reduced. That is, due to the first metal phosphate, the conductivity of the protective film formed on the surface of the positive electrode active material can be improved. As a result, the internal resistance of the manufactured nonaqueous electrolyte secondary battery can be reduced.

When the nonaqueous electrolyte secondary battery is used normally after being manufactured, hydrofluoric acid is produced. The metal phosphate functions as an acid consuming material for hydrofluoric acid produced during normal use. As a result, a decrease in the charge capacity of the nonaqueous electrolyte secondary battery can be suppressed. The function of the metal phosphate as an acid consuming material can be exhibited without depending on the particle size of the metal phosphate. As the particle size decreases, the metal phosphate is likely to become expensive. That is, even the inexpensive second metal phosphate having a large particle size can appropriately function as an acid consuming material. Accordingly, by using both the first metal phosphate and the second metal phosphate, a nonaqueous electrolyte secondary battery having a low internal resistance can be manufactured at a low cost.

In the positive electrode paste preparation step, a ratio of the mass of the second metal phosphate to the sum of the mass of the first metal phosphate and the mass of the second metal phosphate may be 1/3 or higher. As a result, a nonaqueous electrolyte secondary battery having a low internal resistance can be manufactured at a lower cost.

In the positive electrode paste preparation step, a ratio of the mass of the first metal phosphate to the sum of the mass of the first metal phosphate and the mass of the second metal phosphate may be 1/6 or higher. The internal resistance of the nonaqueous electrolyte secondary battery can be reliably reduced.

In the positive electrode paste preparation step, a particle size corresponding to a cumulative value of 10% from the smallest particle size in a combining particle size distribution, which is obtained by combining a particle size distribution of the first metal phosphate with a particle size distribution of the second metal phosphate, may be 0.4 µm or less. By reducing the particle size of a portion of the metal phosphate for forming a highly conductive protective film on the positive electrode active material, the battery can be manufactured at a low cost.

According to a second aspect of the invention, there is provided a nonaqueous electrolyte secondary battery including: a positive electrode sheet including a positive electrode current collector foil and a positive electrode active material layer which is provided on a surface of the positive electrode current collector foil and contains a metal phosphate having at least two peaks in a particle size distribution; a negative electrode sheet; a nonaqueous electrolytic solution which contains an ionic compound having fluorine; and a battery case that accommodates the positive electrode sheet, the negative electrode sheet, and the electrolytic solution.

According to the invention, a method of manufacturing a nonaqueous electrolyte secondary battery can be provided in which a nonaqueous electrolyte secondary battery having a reduced manufacturing cost and a low internal resistance can be manufactured.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is a graph showing initial internal resistance ratios of the batteries according to Examples and Comparative Examples in Second Experiment.

DETAILED DESCRIPTION OF EMBODIMENTS

Hereinafter, a preferred embodiment of the invention will be described in detail with reference to the drawings.

Figure 1:
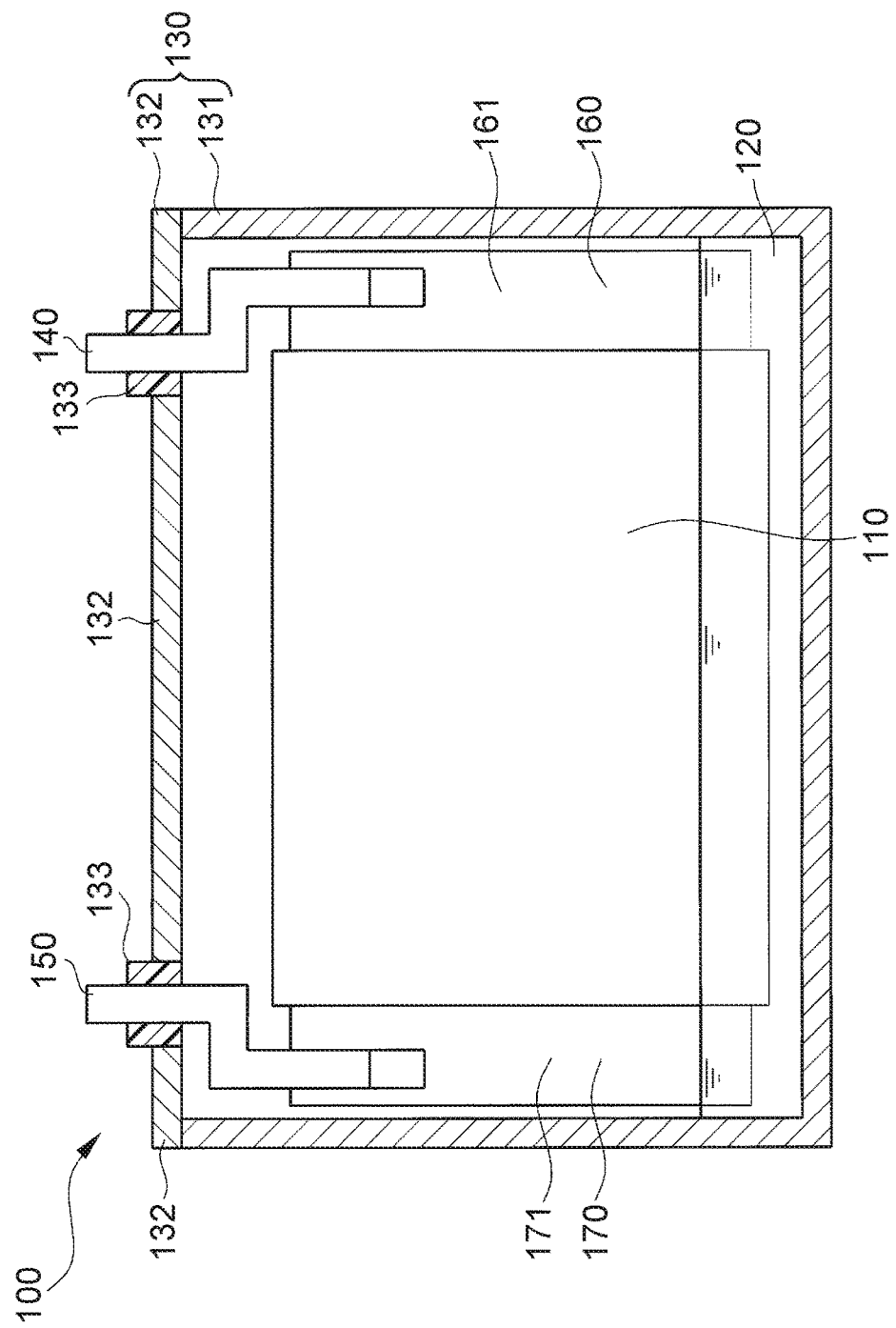
FIG. 1 is a sectional view showing a battery according to an embodiment of the invention.

First, a battery 100 (refer to FIG. 1) according to the embodiment will be described. FIG. 1 shows a sectional view showing the battery 100 according to the embodiment. As shown in FIG. 1, the battery 100 is a lithium ion secondary battery in which an electrode body 110 and an electrolytic solution 120 are accommodated in a battery case 130. The battery case 130 includes a case body 131 and a sealing plate 132. The sealing plate 132 includes an insulating member 133.

The electrolytic solution 120 according to the embodiment is a nonaqueous electrolytic solution in which a lithium salt is dissolved in an organic solvent. Specifically, in the electrolytic solution 120 according to the embodiment, as the organic solvent which is the nonaqueous solvent, a mixed organic solvent is used in which fluoroethylene carbonate (FEC) and methyl 2,2,2-trifluoroethyl carbonate (MTFEC) are mixed with each other at a ratio of 1:1. In the electrolytic solution 120, another nonaqueous solvent can be used, for example, ethylene carbonate (EC), dimethyl carbonate (DMC), or ethyl methyl carbonate (EMC). A combination of the above-described nonaqueous solvents may be used.

In the electrolytic solution 120 according to the embodiment, as the lithium salt, lithium hexafluorophosphate ($LiPF_6$) which is a compound having fluorine is used. That is, the electrolytic solution 120 is a nonaqueous electrolytic solution which contains an ionic compound having fluorine. As the lithium salt, for example, $LiPF_6$, $LiBF_4$, $LiAsF_6$, $LiCF_3SO_3$, $LiC_4F_9SO_3$, $LiN(CF_3SO_2)_2$, or $LiC(CF_3SO_2)_3$ can be used. A combination of the above-described lithium salts may be used. Alternatively, in addition to the lithium salt, $LiClO_4$ or LiI may also be used. In the electrolytic solution 120 according to the embodiment, $LiPF_6$ is added to the above-described mixed organic solvent such that the Li ion concentration is 1.0 mol/L.

Figure 2:
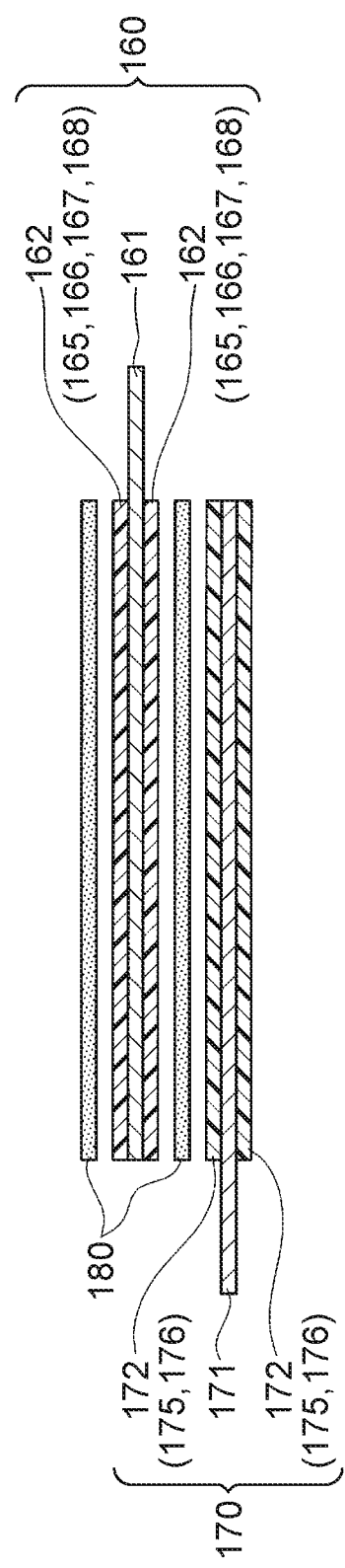
FIG. 2 is a sectional view showing a positive electrode sheet and the like used in the battery according to the embodiment.

FIG. 2 is a sectional view showing a positive electrode sheet 160, a negative electrode sheet 170, and a separator 180 that constitute the electrode body 110. All of the positive electrode sheet 160, the negative electrode sheet 170, and the separator 180 have an elongated sheet shape in a depth direction of FIG. 2. The electrode body 110 is obtained by laminating the positive electrode sheet 160, the negative electrode sheet 170, and the separator 180 as shown in FIG. 2 and winding the obtained laminate in a flat shape in a winding axial direction which is a left-right direction in FIG. 2.

As shown in FIG. 2, in the positive electrode sheet 160, a positive electrode active material layer 162 is formed on both surfaces of a positive electrode current collector foil 161. As the positive electrode current collector foil 161, an aluminum foil can be used. The positive electrode active material layer 162 according to the embodiment includes a positive electrode active material 165, a conductive material 166, a binder 167, and trilithium phosphate 168.

The positive electrode active material 165 is a component contributing to the charging and discharging of the battery 100 and can store and release lithium ions. In the embodiment, in the positive electrode active material 165, the upper limit of the action potential vs. lithium metal (Li) is 4.3 V or higher. As the positive electrode active material 165, for example, a positive electrode active material having a spinel structure and containing nickel (Ni) and manganese (Mn) may be used. In the embodiment, specifically, $LiNi_{0.5}Mn_{1.5}O_4$ is used as the positive electrode active material 165.

The conductive material 166 can improve the conductivity of the positive electrode active material layer 162. The binder 167 binds the materials, which are contained in the positive electrode active material layer 162, to each other to form the positive electrode active material layer 162, and can also bind the positive electrode active material layer 162 to a surface of the positive electrode current collector foil 161. As the conductive material 166, for example, acetylene black (AB) can be used. As the binder 167, for example, polyvinylidene fluoride (PVDF) can be used.

The trilithium phosphate 168 is an additive which can form a protective film on a surface of the positive electrode active material 165 and can function as an acid consuming material during normal use during which the battery 100 is normally charged and discharged. This point will be described below.

As shown in FIG. 2, in the negative electrode sheet 170, a negative electrode active material layer 172 is formed on both surfaces of a negative electrode current collector foil 171. As the negative electrode current collector foil 171, a copper foil can be used. The negative electrode active material layer 172 according to the embodiment includes a negative electrode active material 175 and a binder 176.

The negative electrode active material 175 is a component contributing to the charging and discharging of the battery 100 and can store and release lithium ions. The binder 176 binds the materials, which are contained in the negative electrode active material layer 172, to each other to form the negative electrode active material layer 172, and can also bind the negative electrode active material layer 172 to a surface of the negative electrode current collector foil 171. As the negative electrode active material 175, for example, natural graphite can be used. As the binder 176, for example, styrene-butadiene rubber (SBR) can be used.

As shown in FIG. 2, the positive electrode sheet 160 has a portion where the positive electrode current collector foil 161 is exposed without the positive electrode active material layer 162 being formed. The negative electrode sheet 170 has a portion where the negative electrode current collector foil 171 is exposed without the negative electrode active material layer 172 being formed.

In the wound electrode body 110 shown in FIG. 1, a right end portion consists of only the portion of the positive electrode sheet 160 where the positive electrode current collector foil 161 is exposed. In the wound electrode body 110 shown in FIG. 1, a left end portion consists of only the portion of the negative electrode sheet 170 where the negative electrode current collector foil 171 is exposed.

Further, as shown in FIG. 1, a positive electrode terminal 140 is connected to the right end portion consisting of the positive electrode current collector foil 161 of the electrode body 110. A negative electrode terminal 150 is connected to the left end portion consisting of the negative electrode current collector foil 171 of the electrode body 110. Respective ends of the positive electrode terminal 140 and the negative electrode terminal 150 which are not connected to the electrode body 110 protrude to the outside of the battery case 130 through the insulating member 133.

On the other hand, at the center of the electrode body 110 in FIG. 1, a portion of the positive electrode sheet 160 where the positive electrode active material layer 162 is formed and a portion of the negative electrode sheet 170 where the negative electrode active material layer 172 is formed are laminated with the separator 180 interposed therebetween as shown in FIG. 2. The battery 100 is charged and discharged at the center of the electrode body 110 through the positive electrode terminal 140 and the negative electrode terminal 150.

Figure 3:
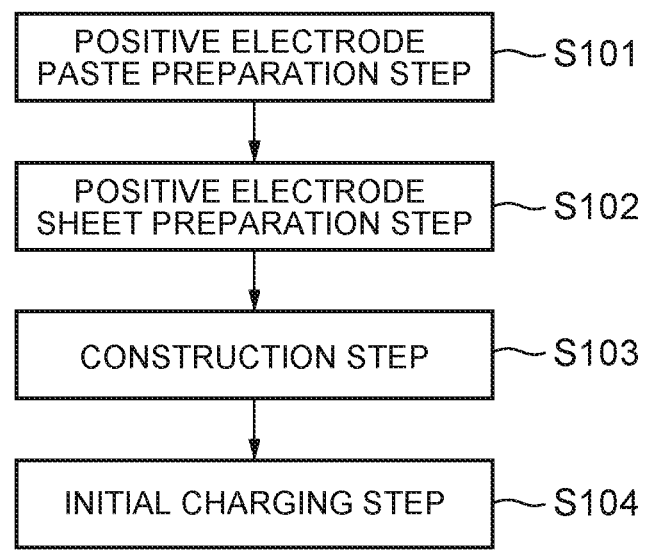
FIG. 3 is a diagram showing the manufacturing procedure of the battery according to the embodiment.

Next, a method of manufacturing the battery 100 according to the embodiment will be described. FIG. 3 shows the manufacturing procedure of the battery 100 according to the embodiment. As shown in FIG. 3, in the embodiment, the battery 100 is manufactured through a positive electrode paste preparation step (S101), a positive electrode sheet preparation step (S102), a construction step (S103), and an initial charging step (S104).

First, the positive electrode paste preparation step (S101) will be described. In the positive electrode paste preparation step, a positive electrode paste which is used for forming the positive electrode active material layer 162 of the positive electrode sheet 160 is prepared. In order to prepare the positive electrode paste, the positive electrode active material 165, the conductive material 166, the binder 167, and the trilithium phosphate 168 are used which are the components contained in the above-described positive electrode active material layer 162. By dispersing these components in a solvent, a positive electrode paste is prepared. The details of the positive electrode paste preparation step will be described below.

Next, the positive electrode sheet preparation step (S102) is performed. In the positive electrode sheet preparation step, the positive electrode active material layer 162 is formed using the positive electrode paste prepared in the positive electrode paste preparation step. That is, the positive electrode sheet 160 is prepared by forming the positive electrode active material layer 162 on a surface of the positive electrode current collector foil 161.

Specifically, first, the positive electrode paste is applied to a region of the surface of the positive electrode current collector foil 161 where the positive electrode active material layer 162 is formed. Next, the applied positive electrode paste is dried to remove the solvent component from the positive electrode paste. As a result, the positive electrode active material layer 162 can be formed on the surface of the positive electrode current collector foil 161.

That is, by drying the positive electrode paste, the respective materials, such as the positive electrode active material 165, which are contained in the positive electrode paste bind to each other through the binder 167, thereby forming the positive electrode active material layer 162. Further, through the binder 167, the positive electrode active material layer 162 binds to the surface of the positive electrode current collector foil 161. As a result, the positive electrode sheet 160 is prepared.

Next, the construction step (S103) is performed. In the construction step, first, the electrode body 110 is prepared. Specifically, the electrode body 110 is prepared by laminating the positive electrode sheet 160, which is manufactured in the positive electrode sheet preparation step, and the negative electrode sheet 170 with the separator 180 interposed therebetween and winding the obtained laminate in a flat shape. As the separator 180, for example, polypropylene (PP) or polyethylene (PE) can be used alone, or a composite material in which plural materials among the above materials are laminated can be used.

The negative electrode sheet 170 can be prepared using a material different from that of the positive electrode sheet 160 according to the same method as that of the positive electrode sheet 160. That is, a negative electrode paste is prepared by dispersing the negative electrode active material 175 and the binder 176 in a solvent, and the negative electrode paste is applied to the negative electrode current collector foil 171.

By drying the applied negative electrode paste, the negative electrode active material layer 172 can be formed. As a result, the negative electrode sheet 170 can be prepared in which the negative electrode active material layer 172 is formed on a surface of the negative electrode current collector foil 171.

Next, the electrode body 110 is accommodated in the case body 131 through an opening. By sealing the opening of the case body 131 with the sealing plate 132, the components are joined to each other. The positive electrode terminal 140 and the negative electrode terminal 150 may be connected to the electrode body 110 before accommodating the electrode body 110 in the case body 131. The joining of the battery case 130 or the joining of the positive and negative electrode terminals 140, 150 and the electrode body 110 can be performed by welding or the like.

Further in the construction step, the electrolytic solution 120 is also accommodated in the battery case 130. The electrolytic solution 120 can be accommodated in the case body 131 through the opening, for example, before the joining of the battery case 130. Alternatively, an liquid injection hole may be provided to connect the inside and the outside of the battery case 130 to each other such that the electrolytic solution 120 can be injected into the battery case 130 through the liquid injection hole. After the injection of the electrolytic solution 120, the liquid injection hole may be sealed. Accordingly, in the construction step, the battery 100 can be constructed.

Next, the initial charging step (S104) is performed. In this step, initial charging is performed in which the battery 100 constructed in the construction step is initially charged. By performing the initial charging step, the battery 100 is manufactured.

Figure 4:
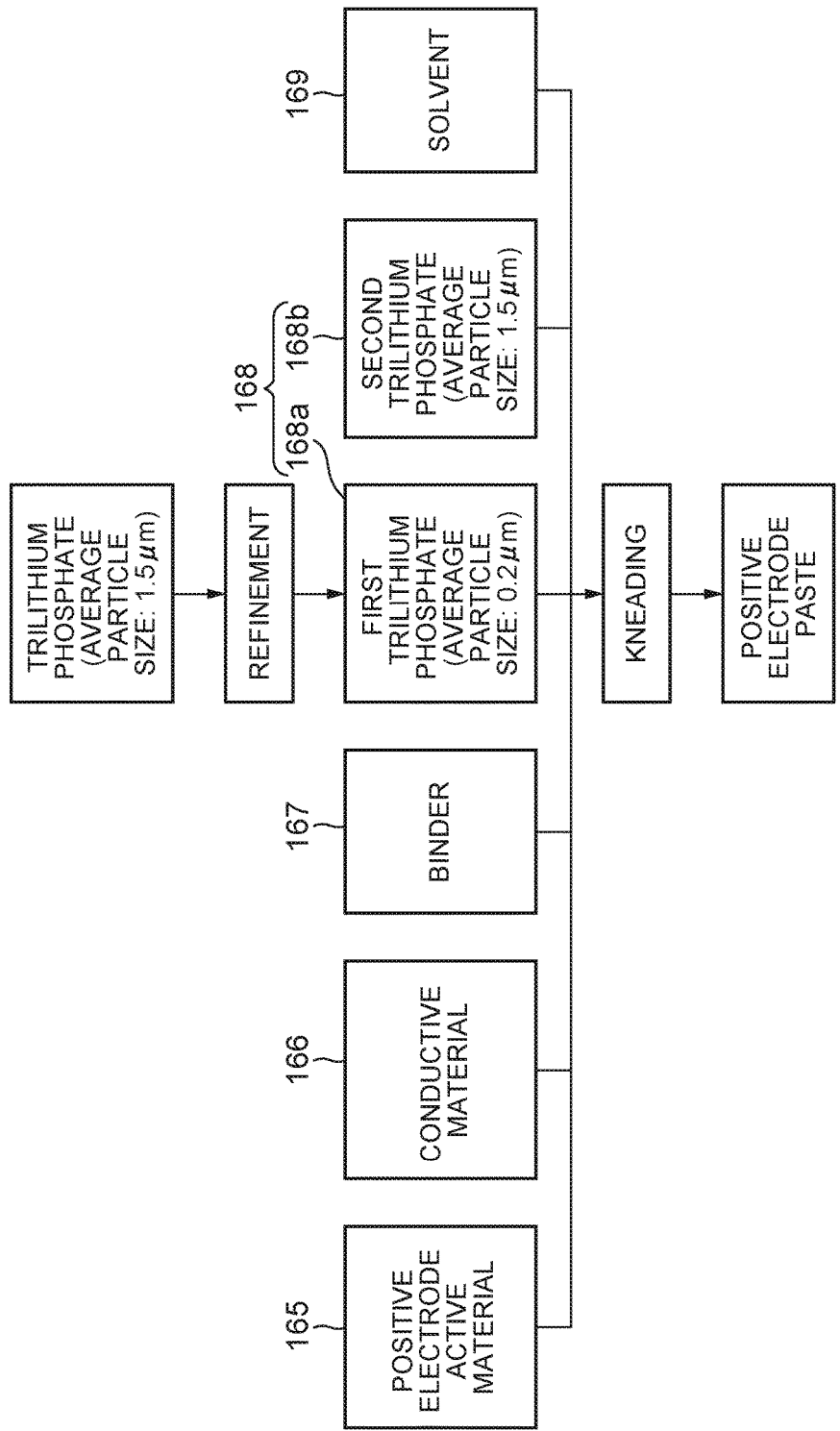
FIG. 4 is a diagram showing a positive electrode paste preparation step according to the embodiment.

Here, the positive electrode paste preparation step (Step S101 of FIG. 3) according to the embodiment will be described in more detail. FIG. 4 shows the details of the positive electrode paste preparation step. As shown in FIG. 4, in the positive electrode paste preparation step, first, the positive electrode active material 165, the conductive material 166, the binder 167, the trilithium phosphate 168, and the solvent 169 which are used in the positive electrode paste are prepared. As the solvent 169, N-methylpyrrolidone (NMP) can be used.

The respective materials including the positive electrode active material 165, the conductive material 166, the binder 167, and the trilithium phosphate 168 are added into the solvent 169 and are kneaded with each other. Due to this kneading, the respective materials including the positive electrode active material 165, the conductive material 166, the binder 167, and the trilithium phosphate 168 are dispersed in the solvent 169 to prepare the positive electrode paste.

In the positive electrode paste preparation step according to the embodiment, as shown in FIG. 4, as the trilithium phosphate 168, a first trilithium phosphate 168a and a second trilithium phosphate 168b are used. The component of the first trilithium phosphate 168a is the same as that of the second trilithium phosphate 168b. However, an average particle size of a group of the first trilithium phosphate 168a and an average particle size of a group of the second trilithium phosphate 168b are different from each other.

Specifically, the average particle size of the first trilithium phosphate 168a is 0.2 µm. On the other hand, the average particle size of the second trilithium phosphate 168b is 1.5 µm. That is, the average particle size of the second trilithium phosphate 168b is more than that of the first trilithium phosphate 168a by 1.3 µm or more. In the embodiment, the average particle size refers to a median size which a particle size corresponding to a cumulative value of 50% in a volume particle size distribution which is obtained using a laser diffraction scattering method.

In the first trilithium phosphate 168a according to the embodiment, as shown in FIG. 4, trilithium phosphate powder having an average particle size of 1.5 µm is refined to reduce the average particle size to 0.2 µm. In the embodiment, as the second trilithium phosphate 168b, the trilithium phosphate powder having an average particle size of 1.5 µm before the refinement of the first trilithium phosphate 168a can be used.

The refinement can be performed using a wet pulverizer. In the embodiment, specifically, by performing refinement using a wet bead mill, the first trilithium phosphate 168a having an average particle size of 0.2 µm is prepared. In the refinement according to the embodiment which is performed through a wet process, NMP is used as a solvent as in the case of the solvent 169 which is used for manufacturing the positive electrode paste.

During the kneading of the positive electrode paste, the first trilithium phosphate 168a is added in a state of being dispersed in NMP due to the refinement. On the other hand, during the kneading of the positive electrode paste, the second trilithium phosphate 168b is added in a powder state. During the kneading of the positive electrode paste, each of the positive electrode active material 165, the conductive material 166, and the binder 167 is added in a powder state.

Due to this kneading, the positive electrode paste is prepared in which the respective materials including the positive electrode active material 165, the conductive material 166, the binder 167, and the trilithium phosphate 168 are dispersed in NMP. During the kneading in the positive electrode paste preparation step, it is not necessary to add the respective materials at the same time. The respective materials may be sequentially added to the solvent 169. That is, after the previous material is appropriately dispersed in the solvent 169 by kneading, the kneading may be performed while adding the next materials sequentially. In the positive electrode paste preparation step, the kneading can be performed using a high-speed disperser HOMO DISPERSER.

In the positive electrode sheet preparation step according to the embodiment, the positive electrode active material layer 162 is formed using the positive electrode paste prepared in the positive electrode paste preparation step shown in FIG. 4. Therefore, the positive electrode active material layer 162 of the positive electrode sheet 160 prepared in the positive electrode sheet preparation step contains the first trilithium phosphate 168a and the second trilithium phosphate 168b.

Here, functions of the trilithium phosphate 168 in the manufactured battery 100 will be described. For example, the trilithium phosphate 168 has a first function of forming a protective film on a surface of the positive electrode active material 165. For example, the trilithium phosphate 168 has a second function as an acid consuming material when the battery 100 is used normally. Hereinafter, the functions of the trilithium phosphate 168 will be sequentially described.

First, the formation of a protective film on a surface of the positive electrode active material 165, which is the first function of the trilithium phosphate 168, will be described. In the embodiment, as described above, as the positive electrode active material 165, $LiNi_{0.5}Mn_{1.5}O_4$ is used in which the upper limit of the action potential vs. lithium metal is 4.3 V or higher. Accordingly, in the initial charging step, in the positive electrode active material 165, the upper limit of the action potential vs. lithium metal is 4.3 V or higher.

On the surface of the positive electrode active material 165 in the positive electrode active material layer 162 in which the potential is increased to be 4.3 V or higher, the solvent component in the electrolytic solution 120 is oxidatively decomposed to produce hydrogen ions. Further, the produced hydrogen ions react with fluorine ions in the electrolytic solution 120 to produce hydrofluoric acid (HF).

Hydrofluoric acid produced in the initial charging step reacts with the trilithium phosphate 168 contained in the positive electrode active material layer 162. The trilithium phosphate 168 and hydrofluoric acid react with each other to form a film on a surface of the positive electrode active material 165. The film formed on the surface of the positive electrode active material 165 contains fluorine (F) and phosphorus (P). Specifically, it is presumed that the film contains a compound having fluorine (more specifically, a fluorine compound; for example LiF) and a compound having phosphorus (more specifically, a compound having phosphate ions; for example, $Li_3PO_4$, $Li_2HPO_4$, $LiH_2PO_4$, or $H_3PO_4$).

This film can function as the protective film of the positive electrode active material 165. That is, in the positive electrode active material 165 on which the protective film is formed, the elution of transition metal caused by hydrofluoric acid is suppressed.

Figure 5:
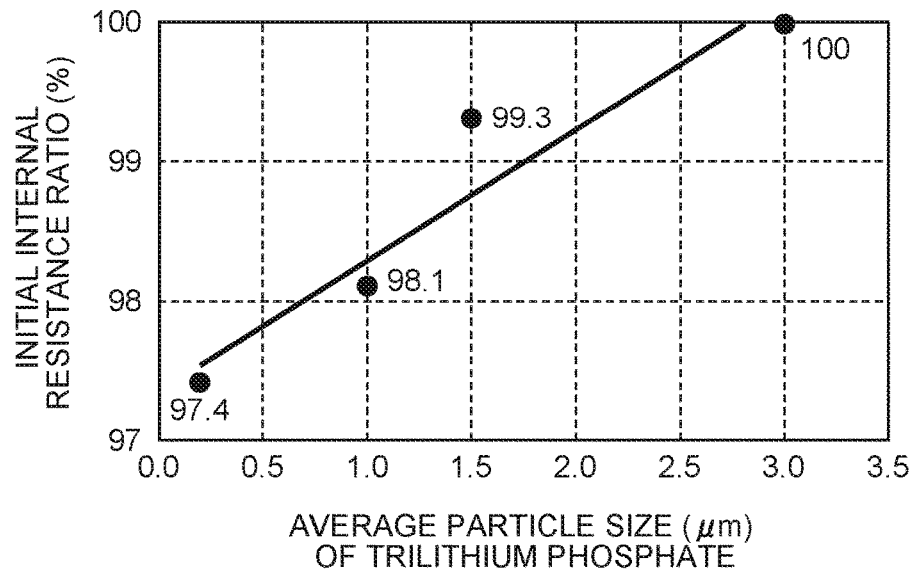
FIG. 5 is a graph showing a relationship between an average particle size of trilithium phosphate and an initial internal resistance ratio.

The present inventors found that, in the protective film of the positive electrode active material 165 which is formed by the reaction of the trilithium phosphate 168 and hydrofluoric acid, as the particle size of the trilithium phosphate 168 decreases, the conductivity is likely to be improved. FIG. 5 is a graph showing a relationship between an initial internal resistance ratio of a battery and an average particle size of trilithium phosphate.

FIG. 5 shows the results of measuring the initial internal resistances of test batteries which are lithium ion secondary batteries manufactured using trilithium phosphates having different average particle sizes. In order to obtain the graph of FIG. 5, lithium ion secondary batteries having the same configuration as that of the battery 100 according to the embodiment are used. However, in the test batteries used for obtaining the graph of FIG. 5, unlike the embodiment, two kinds of trilithium phosphates having different average particle sizes are not used.

That is, the graph of FIG. 5 is created by measuring the initial internal resistance, which is the internal resistance after the initial charging step, of each of the test batteries manufactured using one kind of trilithium phosphate. At this time, the average particle sizes of the trilithium phosphates of the test batteries are different from each other. Specifically, as shown in FIG. 5, the respective test batteries are manufactured using trilithium phosphate having an average particle size of 0.2 μm, trilithium phosphate having an average particle size of 1.0 μm, trilithium phosphate having an average particle size of 1.5 μm, and trilithium phosphate having an average particle size of 3.0 μm, respectively. The initial internal resistance ratio of each of the test batteries shown in the vertical axis of FIG. 5 refers to a ratio of the initial internal resistance value of each of the test batteries to the initial internal resistance value of the test battery manufactured using trilithium phosphate having an average particle size of 3.0 μm.

As shown in FIG. 5, it can be seen that, as the average particle size of trilithium phosphate in the test battery decreases, the initial internal resistance decreases. The reason for this is presumed to be that, as the particle size of trilithium phosphate decreases, the conductivity of a protective film formed on a surface of the positive electrode active material 165 can be improved (high).

That is, as the particle size of trilithium phosphate decreases, the dispersibility is high. Therefore, the trilithium phosphate can be uniformly dispersed in the positive electrode paste. As trilithium phosphate is more uniformly dispersed in the positive electrode paste, trilithium phosphate can be more uniformly dispersed in the positive electrode active material layer. Further, as trilithium phosphate is more uniformly dispersed in the positive electrode active material layer, the reaction frequency between trilithium phosphate and hydrofluoric acid can be improved. The reason for this is that the frequency in which trilithium phosphate is present is high in a position where hydrofluoric acid is produced.

Since the reaction frequency between trilithium phosphate and hydrofluoric acid is high, the protective film can be formed on the surface of the positive electrode active material 165 within a short period of time. It is considered that, by forming the protective film of the positive electrode active material 165 within a short period of time, the thickness of the protective film can be reduced and the conductivity can be improved. Accordingly, as the particle size of trilithium phosphate decreases, a lithium ion secondary battery having a low internal resistance can be manufactured.

Next, the function as an acid consuming material during normal use, which is the second function of the trilithium phosphate 168, will be described. As described above, in the initial charging step of the battery 100, the upper limit of the action potential of the positive electrode active material 165 vs. lithium metal is 4.3 V or higher, thereby producing hydrofluoric acid. The hydrofluoric acid may be produced not only in the initial charging step but also by subsequent charging during normal use. The reason for this is as follows. Due to the charging during normal use, in the positive electrode active material 165, the upper limit of the action potential vs. lithium metal is 4.3 V or higher.

Hydrofluoric acid produced during normal use causes transition metal to be eluted even from the positive electrode active material 165 after the formation of the protective film. That is, in a state where a large amount of hydrofluoric acid is produced, transition metal may be eluted from the positive electrode active material 165. Due to the elution of transition metal from the positive electrode active material 165, the charge capacity of the battery 100 may decrease.

However, in the battery 100 according to the embodiment, because the positive electrode active material layer 162 contains the trilithium phosphate 168, the trilithium phosphate 168 can function as an acid consuming material. That is, the trilithium phosphate 168 which is not consumed during the formation of the protective film on the positive electrode active material 165 in the initial charging step remains in the positive electrode active material layer 162. By the trilithium phosphate 168 functioning as an acid consuming material which reacts with hydrofluoric acid, the elution of transition metal from the positive electrode active material 165 can be suppressed. By suppressing the elution of transition metal from the positive electrode active material 165, a decrease in the charge capacity of the battery 100 can be suppressed.

Figure 6:
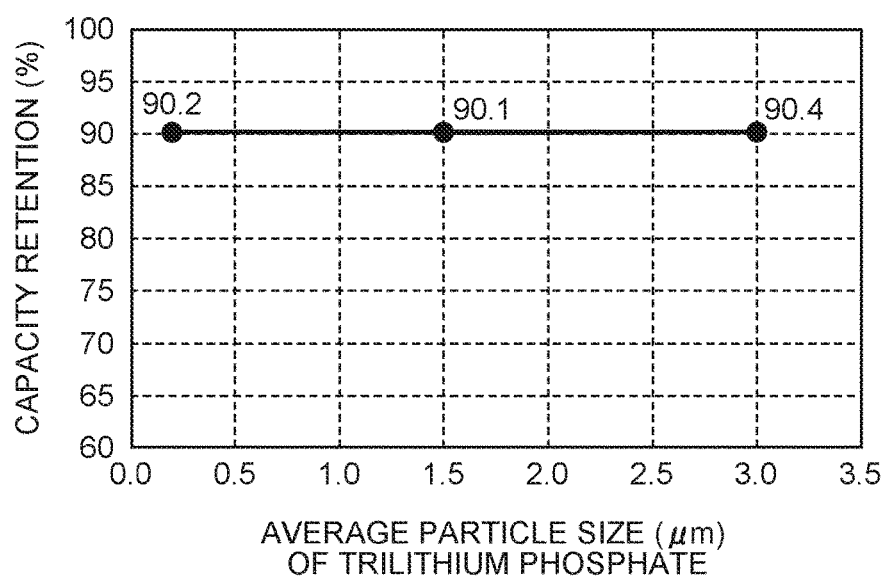
FIG. 6 is a graph showing a relationship between an average particle size of trilithium phosphate and a capacity retention.

The present inventors found that it is not necessary that the particle size of the trilithium phosphate 168, which functions as an acid consuming material during normal use, is small unlike the trilithium phosphate 168 which contributes to the formation of the protective film on the positive electrode active material 165. FIG. 6 is a graph showing a relationship between a capacity retention of a battery and an average particle size of trilithium phosphate.

FIG. 6 shows the results of measuring the capacity retentions of test batteries which are lithium ion secondary batteries manufactured using trilithium phosphates having different average particle sizes. In order to obtain the graph of FIG. 6, lithium ion secondary batteries having the same configuration as that of the battery 100 according to the embodiment are used. However, in the test batteries used for obtaining the graph of FIG. 6, unlike the embodiment, two kinds of trilithium phosphates having different average particle sizes are not used as in the case of FIG. 5. Specifically, as shown in FIG. 6, the respective test batteries are manufactured using trilithium phosphate having an average particle size of 0.2 µm, trilithium phosphate having an average particle size of 1.5 µm, and trilithium phosphate having an average particle size of 3.0 µm, respectively.

FIG. 6 is created by measuring the capacity retention of each of the test batteries. The capacity retention refers to a ratio of the charge capacity after a cycle test to the initial charge capacity before the cycle test. The cycle test is performed by charging and discharging each of the test batteries multiple times.

As shown in FIG. 6, it can be seen that, even in a case where trilithium phosphates having different average particle sizes are used, the capacity retentions of the lithium ion secondary batteries are the substantial same. That is, the function of the trilithium phosphate as an acid consuming material can be exhibited without depending on the particle size of the trilithium phosphate.

Therefore, in the positive electrode paste preparation step according to the embodiment, as described above, as the trilithium phosphate 168, the first trilithium phosphate 168a having an average particle size of 0.2 µm and the second trilithium phosphate 168b having an average particle size of 1.5 µm are used.

In the battery 100 according to the embodiment, in the initial charging step, the first trilithium phosphate 168a, which is contained in the positive electrode active material layer 162 of the positive electrode sheet 160, reacts with hydrofluoric acid such that the protective film can be formed on the surface of the positive electrode active material 165. The average particle size of the first trilithium phosphate 168a is 0.2 µm and is small. Accordingly, the protective film which is formed on the surface of the positive electrode active material 165 in the initial charging step of the battery 100 according to the embodiment can exhibit high conductivity. The battery 100 can exhibit a low internal resistance.

On the other hand, the second trilithium phosphate 168b can function as an acid consuming material for hydrofluoric acid which is produced when the battery 100 is used normally. The average particle size of the second trilithium phosphate 168b is 1.5 µm and is large. However, since the function as an acid consuming material does not have a relationship with the particle size, even the second trilithium phosphate 168b having a large particle size can appropriately function as an acid consuming material, and a decrease in the charge capacity of the battery 100 can be suppressed.

The second trilithium phosphate 168b having a large particle size is more inexpensive than the first trilithium phosphate 168a having a small particle size. The reason for this is that, as described above, it is not necessary to refine the second trilithium phosphate 168b unlike the first trilithium phosphate 168a.

Accordingly, in the battery 100 according to the embodiment, the internal resistance is low, and a decrease in charge capacity during use is appropriately suppressed. Further, the manufacturing cost of the battery 100 can be reduced as compared to a case where only the first trilithium phosphate 168a is used.

The present inventors verified the effects of the invention in Experiments 1 and 2 described below. First, First Experiment will be described. In First Experiment, batteries according to Examples 1, 2, and 3 of the invention and batteries according to Comparative Examples 1 and 2 were prepared and used.

In First Experiment, the batteries according to Examples were different from the batteries according to Comparative Examples in the trilithium phosphate used in the positive electrode paste preparation step. Regarding the other conditions, there was no difference between the batteries according to Examples and the batteries according to Comparative Examples. Hereinafter, conditions of the positive electrode paste preparation step common to Examples and Comparative Examples will be described.

[Materials Used in Positive Electrode Paste]

Positive electrode active material: $LiNi_{0.5}Mn_{1.5}O_4$

Conductive material: acetylene black (AB)

Binder: polyvinylidene fluoride (PVDF)

Additive: trilithium phosphate ($Li_3PO_4$)

Solvent: N-methylpyrrolidone (NMP)

[Mass Ratio (Weight Percentage) in Positive Electrode Paste]

positive electrode active material:conductive material:binder:additive=92.1:0.9:4.0:3.0

[Kneading Conditions]

Paste preparing device: high-speed disperser HOMO DISPERSER

Rotating speed: 2000 rpm to 4000 rpm

That is, in First Experiment, in Examples and Comparative Examples, the amount of trilithium phosphate used as the additive of the positive electrode paste was 3.0 wt %. Table 1 below shows the details of trilithium phosphate used in the positive electrode paste preparation step regarding Examples and Comparative Examples in First Experiment.

TABLE 1

Amount of Trilithium phosphate Used

| | Small Particles (Average Particle Size: 0.2 μm) | Large Particles (Average Particle Size: 1.5 μm) | Small Particle Ratio |
|---|---|---|---|
| Example 1 | 0.5 wt % | 2.5 wt % | About 17% |
| Example 2 | 1.0 wt % | 2.0 wt % | About 33% |
| Example 3 | 2.0 wt % | 1.0 wt % | About 67% |
| Comparative Example 1 | 0 wt % | 3.0 wt % | 0% |
| Comparative Example 2 | 3.0 wt % | 0 wt % | 100% |

As shown in Table 1, in all of the Examples, as described above in the embodiment, both trilithium phosphate having an average particle size of 0.2 μm and trilithium phosphate having an average particle size of 1.5 μm were used. In Table 1, the trilithium phosphate having an average particle size of 0.2 μm is represented by "Small Particles", and the trilithium phosphate having an average particle size of 1.5 μm is represented by "Large Particles". On the other hand, in Comparative Example 1, only the trilithium phosphate having an average particle size of 1.5 μm, which is represented by "Large Particles", was used. In Comparative Example 2, only the trilithium phosphate having an average particle size of 0.2 μm, which is represented by "Small Particles", was used.

Table 1 shows the small particle ratio regarding Examples and Comparative Examples. The small particle ratio refers to a ratio of the mass of the trilithium phosphate having an average particle size of 0.2 μm to the sum of the mass of the trilithium phosphate having an average particle size of 0.2 μm and the mass of the trilithium phosphate having an average particle size of 1.5 μm.

A positive electrode sheet according to each of Examples and Comparative Examples was prepared by forming a positive electrode active material layer on an aluminum foil as a positive electrode current collector foil using a positive electrode paste obtained in the positive electrode paste preparation step under the above-described conditions. During the preparation of the positive electrode sheets according to Examples and Comparative Examples, the respective conditions including application conditions of the positive electrode sheet and drying conditions of the positive electrode paste are the same. Batteries according to Examples and Comparative Examples were prepared using the positive electrode sheets prepared as described above. In Examples and Comparative Examples, components other than the positive electrode sheet such as a negative electrode sheet or an electrolytic solution were the same as those of the above-described battery 100.

Figure 7:
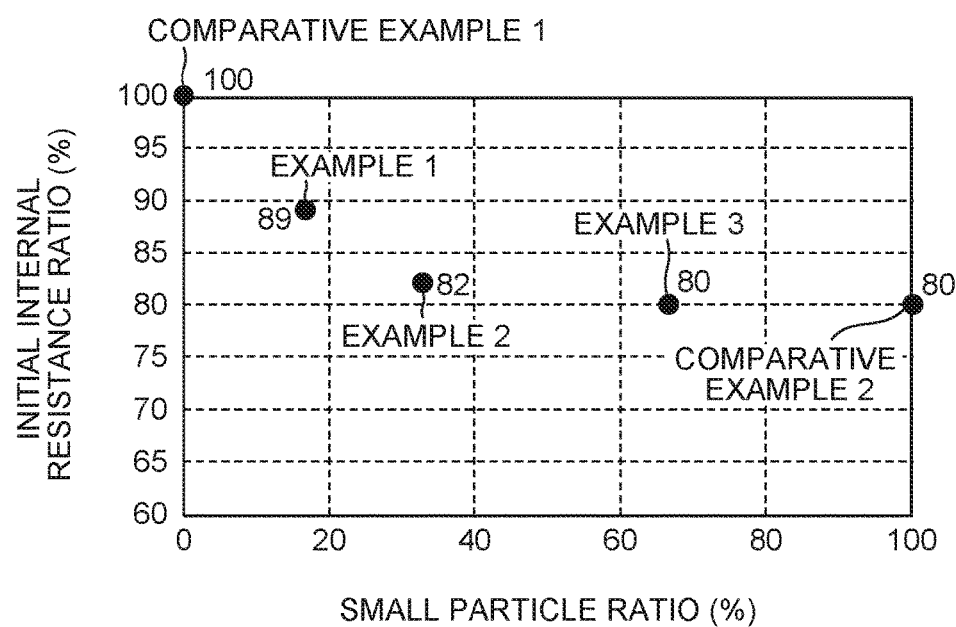
FIG. 7 is a graph showing initial internal resistance ratios of batteries according to Examples and Comparative Examples in First Experiment.

In First Experiment, the initial internal resistances of the batteries of Examples and Comparative Examples which were measured after initial charging were compared to each other. The initial internal resistances were measured by discharging each of the batteries according to Examples and Comparative Examples from SOC 60% for a predetermined amount of time in a temperature environment of 25° C. and obtaining the voltage change amount during the predetermined amount of time. FIG. 7 shows a relationship between an initial internal resistance ratio and a small particle ratio regarding the batteries according to Examples and Comparative Examples.

The initial internal resistance ratio of each of the batteries according to Examples and Comparative Examples shown in the vertical axis of FIG. 7 refers to a ratio of the initial internal resistance value each of the batteries according to Examples and Comparative Examples to the initial internal resistance value of the battery according to Comparative Example 1. As can be seen from FIG. 7, the initial internal resistance values of the batteries according to Examples were lower than that of the battery according to Comparative Example 1. The initial internal resistance value of the battery according to Example 2 was also lower than that of the battery according to Comparative Example 1.

The reason for this is as follows. In the battery according to Comparative Example 1, the positive electrode sheet was prepared using only the trilithium phosphate having an average particle size of 1.5 μm. On the other hand, in the batteries according to Examples and Comparative Example 2, the positive electrode sheet was prepared using the trilithium phosphate having an average particle size of 0.2 μm. That is, in the batteries according to Examples and Comparative Example 2, the conductivity of the protective film of the positive electrode active material was high, and the internal resistances of the batteries were reduced to be lower than that of the battery according to Comparative Example 1.

In the battery according to Comparative Example 2, the positive electrode sheet was prepared using only the trilithium phosphate having an average particle size of 0.2 μm. Therefore, in the battery according to Comparative Example 2, the internal resistance was low, but the manufacturing cost was high. The reason for this is that the trilithium phosphate having an average particle size of 0.2 μm was prepared by the refinement and was more expensive than the trilithium phosphate having an average particle size of 1.5 μm.

On the other hand, in all of the positive electrode sheets of the batteries according to Examples, not only the trilithium phosphate having an average particle size of 0.2 μm but also the trilithium phosphate having an average particle size of 1.5 μm were used. Therefore, in all of the batteries according to Examples, the manufacturing cost is more inexpensive than that of the battery according to Comparative Example 2.

As shown in FIG. 7, in First Experiment, it was verified that the internal resistance of the battery according to Example 3 was the same as the internal resistance of the battery according to Comparative Example 2. Therefore, it can be seen that, in the positive electrode paste preparation step, it is preferable that the ratio of the mass of the trilithium phosphate having an average particle size of 1.5 μm to the sum of the mass of the trilithium phosphate having an average particle size of 0.2 μm and the mass of the trilithium phosphate having an average particle size of 1.5 μm is ⅓ or higher.

The reason for this is as follows. In a case where the ratio of the mass of the trilithium phosphate having an average particle size of 1.5 μm to the sum of the masses of the trilithium phosphates is lower than ⅓, the effect of reducing the internal resistance of the battery cannot be expected that much as compared to a case where the ratio is ⅓. On the other hand, as the ratio of the mass of the trilithium phosphate having an average particle size of 1.5 μm decreases, the manufacturing cost of the battery is increased. That is, by controlling the ratio of the mass of the trilithium phosphate having an average particle size of 1.5 μm to the sum of the masses of the trilithium phosphates to be ⅓ or higher, a battery having a low internal resistance can be manufactured at a low cost.

It also can be seen from First Experiment that, in the positive electrode paste preparation step, it is preferable that the ratio of the mass of the trilithium phosphate having an average particle size of 0.2 μm to the sum of the masses of the trilithium phosphates is ⅙ or higher as in Example 1. By controlling the ratio of the mass of the trilithium phosphate having an average particle size of 0.2 μm to be ⅙ or higher as in Example 1, the effect of reducing the internal resistance of the battery can be reliably exhibited.

Next, Second Experiment will be described. In Second Experiment, batteries according to Examples 4, 5, and 6 of the invention and batteries according to Comparative Examples 3 and 4 were prepared and used.

In Second Experiment, the batteries according to Examples were different from the batteries according to Comparative Examples in the trilithium phosphate used in the positive electrode paste preparation step. In Second Experiment, regarding the other conditions, there was no difference between the batteries according to Examples and the batteries according to Comparative Examples. In Second Experiment, conditions of the positive electrode paste preparation step common to Examples and Comparative Examples were the same as in First Experiment described above. The manufacturing conditions of the batteries using the prepared positive electrode paste are the same as in First Experiment described above.

In Second Experiment, in Examples and Comparative Examples, as in the case of First Experiment, the amount of trilithium phosphate used in the positive electrode paste was 3.0 wt %. Table 2 below shows the details of trilithium phosphate used in the positive electrode paste preparation step regarding Examples and Comparative Examples in Second Experiment.

TABLE 2

| | Trilithium Phosphate | | | | | |
| | Small Particles | | Large Particles | | | |
| | Average Particle size | Amount Used | Average Particle size | Amount Used | Small Particle Ratio | D10 Particle Size |
|---|---|---|---|---|---|---|
| Example 4 | 0.2 μm | 0.6 wt % | 3.0 μm | 2.4 wt % | 20% | 0.2 μm |
| Example 5 | 0.4 μm | 0.6 wt % | 3.0 μm | 2.4 wt % | 20% | 0.4 μm |
| Example 6 | 0.6 μm | 0.6 wt % | 3.0 μm | 2.4 wt % | 20% | 0.6 μm |
| Comparative Example 3 | — | 0 wt % | 3.0 μm | 3.0 wt % | 0% | — |
| Comparative Example 4 | 0.4 μm | 3.0 wt % | — | 0 wt % | 100% | — |

As shown in Table 2, in Examples of Second Experiment, not only "Small Particles" but also "Large Particles" were used as the trilithium phosphate. Specifically, in Examples 4, 5, and 6, trilithium phosphate having an average particle size of 0.2 μm, trilithium phosphate having an average particle size of 0.4 μm, and trilithium phosphate having an average particle size of 0.6 μm were used as the trilithium phosphate of "Small Particles". In Examples 4, 5, and 6, trilithium phosphate having an average particle size of 3.0 μm was used as the trilithium phosphate of "Large Particles". That is, in Examples of Second Experiment, as the trilithium phosphate of "Large Particles", trilithium phosphate having an average particle size which was more than that of the trilithium phosphate of "Small Particles" by 1.3 μm or more was used. In Second Experiment, the trilithium phosphate of "Small Particles" was prepared by refining the same trilithium phosphate as the trilithium phosphate of "Large Particles".

On the other hand, in Comparative Example 3, only the trilithium phosphate of "Large Particles" was used. In Comparative Example 4, only the trilithium phosphate of "Small Particles" was used. Specifically, in Comparative Example 3, only the trilithium phosphate having an average particle size of 3.0 μm was used. In Comparative Example 4, only the trilithium phosphate having an average particle size of 0.4 μm was used. Table 2 shows the small particle ratio regarding Examples and Comparative Examples.

Figure 8:
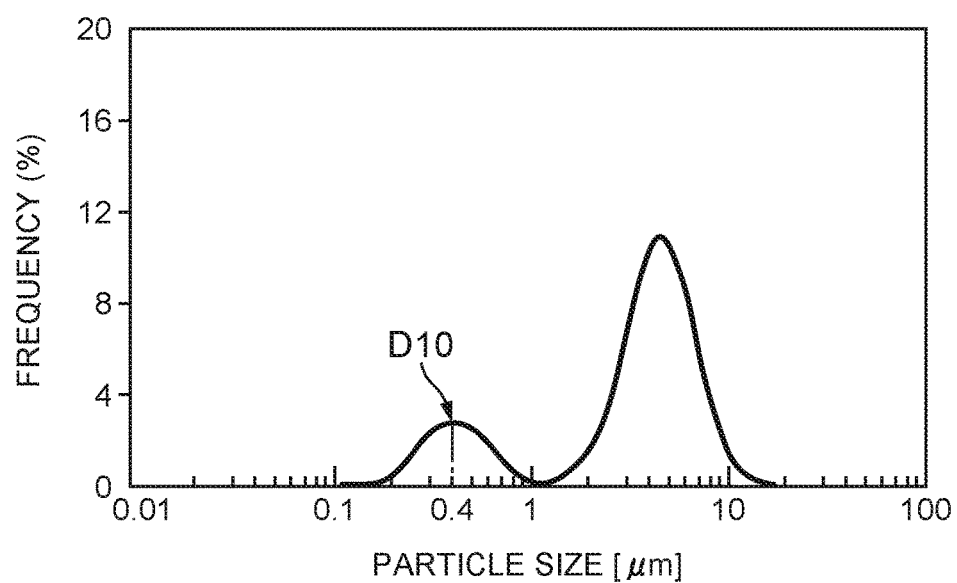
FIG. 8 is a graph showing an example of a combining particle size distribution which is obtained by combining a particle size distribution of small trilithium phosphate with a particle size distribution of large trilithium phosphate.

Further, Table 2 according to Second Experiment shows "D10 particle size" in each of Examples. "D10 particle size" refers to a particle size corresponding to a cumulative value of 10% from the smallest particle size in a combining particle size distribution which is obtained by combining a particle size distribution of the trilithium phosphate of "Small Particles" with a particle size distribution of the trilithium phosphate of "Large Particles". The combining particle size distribution in Second Experiment is created by individually obtaining particle size distributions from a group of particles of the trilithium phosphate of "Small Particles" and a group of particles of the trilithium phosphate of "Large Particles" and combining the particle size distributions with each other. FIG. 8 shows Example 5 as an example of the combining particle size distribution of the trilithium phosphates of "Small Particles" and "Large Particles".

The particle size distributions of the trilithium phosphates used for obtaining "D10 particle size" in Second Experiment are volume particle size distributions obtained using a laser diffraction scattering method. The combining particle size distribution of the trilithium phosphates of "Small Particles" and "Large Particles" can also be obtained from mixed particles of the trilithium phosphates of "Small Particles" and "Large Particles". The particle size distribution of trilithium phosphate of a manufactured nonaqueous electrolyte secondary battery may be obtained by taking an electron microscope image of a surface of a positive electrode sheet extracted from the nonaqueous electrolyte secondary battery and measuring the number of trilithium phosphate particles and the particle sizes thereof.

In Second Experiment, the initial internal resistances of the batteries of Examples and Comparative Examples which were measured after initial charging were compared to each other. The initial internal resistances were measured using the same method as in First Experiment. FIG. 9 shows a relationship between an initial internal resistance ratio and a small particle ratio regarding the batteries according to Examples and Comparative Examples. The initial internal resistance ratio of each of the batteries according to Examples and Comparative Examples shown in the vertical axis of FIG. 9 refers to a ratio of the initial internal resistance value each of the batteries according to Examples and Comparative Examples to the initial internal resistance value of the battery according to Comparative Example 3.

As can be seen from FIG. 9, in Second Experiment, the initial internal resistance values of the batteries according to Examples were lower than that of the battery according to Comparative Example 3. The initial internal resistance value of the battery according to Example 4 was also lower than that of the battery according to Comparative Example 3.

The reason for this is as follows. In the battery according to Comparative Example 3, the positive electrode sheet was prepared using only the trilithium phosphate of "Large Particles" having a large average particle size. On the other hand, in the batteries according to Examples and Comparative Example 4, the positive electrode sheet was prepared using the trilithium phosphate of "Small Particles" having an average particle size which was less than that of "Large Particles" by 1.3 µm or more. That is, in Second Experiment, in the batteries prepared using the trilithium phosphate of "Small Particles" having an average particle size which was less than that of "Large Particles" by 1.3 µm or more, the conductivity of the protective film of the positive electrode active material was high, and thus the internal resistance of the battery was reduced.

In Second Experiment, in the battery according to Comparative Example 4, the positive electrode sheet was prepared using only the trilithium phosphate of "Small Particles". On the other hand, in all of the positive electrode sheets of the batteries according to Examples, not only the trilithium phosphate of "Small Particles" but also the trilithium phosphate of "Large Particles" were used. Therefore, in all of the batteries according to Examples, the manufacturing cost is more inexpensive than that of the battery according to Comparative Example 4.

As shown in FIG. 9, in Second Experiment, it was verified that the internal resistances of the batteries according to Examples 4 and 5 were the same as the internal resistance of the battery according to Comparative Example 4. Accordingly, in the positive electrode paste preparation step, it can be seen that it is preferable that "D10 particle size" corresponding to a cumulative value of 10% from the smallest particle size in the combining particle size distribution of the trilithium phosphate of "Small Particles" and the trilithium phosphate of "Large Particles" is 0.4 µm or less. The reason for this is as follows. Although the inexpensive trilithium phosphate of "Large Particles" is used, the internal resistance of the battery can be made to be low to the same extent as a case where only the trilithium phosphate of "Small Particles" is used. The reason for this is presumed to be that the group of particles of the trilithium phosphate having a "D10 particle size" of 0.4 µm or less contains a sufficient amount of trilithium phosphate particles having a small particle size which can improve the conductivity of the protective film of the positive electrode active material. Since the particle size of a portion of the trilithium phosphate used for forming a highly conductive protective film on the positive electrode active material is reduced, the battery can be manufactured at a low cost.

In the above-described battery 100, the example in which the trilithium phosphate 168 is used as the additive of the positive electrode active material layer 162 has been described. However, instead of the trilithium phosphate 168, another metal phosphate can also be used. That is, the metal phosphate which is the additive of the positive electrode active material layer 162 can contain alkali metal and at least one of Group 2 elements as metal and contains a phosphate or a pyrophosphate containing phosphate ions ($PO_4^{3-}$). That is, as the additive of the positive electrode active material layer 162, for example, sodium phosphate ($Na_3PO_4$), potassium phosphate ($K_3PO_4$), magnesium phosphate ($Mg_3(PO_4)_2$), or calcium phosphate ($Ca_3(PO_4)_2$) can be used instead of the trilithium phosphate 168.

The reason for this is that the above-described metal phosphate can exhibit the first function of forming a protective film on the positive electrode active material and the second function as an acid consuming material during normal use. Since high voltage resistance is exhibited at a high voltage, the above-described two functions can be appropriately exhibited even in a battery having a high open-circuit voltage such as the battery 100 according to the embodiment. A combination of plural kind of the metal phosphates may be used. In the above-described embodiment, two metal phosphates (trilithium phosphates) having different average particle sizes are mixed with each other. However, three or more metal phosphates having different average particle sizes may be mixed with each other.

As described above in detail, the method of manufacturing a nonaqueous electrolyte secondary battery according to the embodiment includes the positive electrode paste preparation step, the positive electrode sheet preparation step, the construction step, and the initial charging step. In the positive electrode paste preparation step, as the trilithium phosphate, a group of first trilithium phosphate particles and a group of second trilithium phosphate particles are used, in which the average particle size of the group of the second trilithium phosphate particles is more than that of the group of the first trilithium phosphate particles by 1.3 µm or more. Due to the group of the first trilithium phosphate particles, a highly conductive protective film can be formed on a surface of the positive electrode active material, and the internal resistance of the battery can be reduced. Further, the inexpensive second trilithium phosphate particles can function as an acid consuming material for hydrofluoric acid which is produced when the battery is used normally. As a result, a method of manufacturing a nonaqueous electrolyte secondary battery can be realized in which a nonaqueous electrolyte secondary battery having a reduced manufacturing cost and a low internal resistance can be manufactured.

The embodiment is merely exemplary and does not limit the invention. Accordingly, the invention can be improved and modified in various ways within a range not departing from the scope of the invention. For example, the shape of the wound electrode body 110 is not limited to a flat shape, but a wound electrode body having a cylindrical shape can also be used. In addition, for example, the invention can be applied not only a wound electrode body but also a laminate electrode body.

What is claimed is:
1. A method of manufacturing a nonaqueous electrolyte secondary battery,
    the nonaqueous electrolyte secondary battery including a positive electrode sheet, a negative electrode sheet, a nonaqueous electrolytic solution which contains an ionic compound having fluorine, and a battery case that accommodates the positive electrode sheet, the negative electrode sheet, and the electrolytic solution,
    the positive electrode sheet including a positive electrode current collector foil and a positive electrode active material layer which is formed on a surface of the positive electrode current collector foil, and
    the method comprising:
        a positive electrode paste preparation step of preparing a positive electrode paste by dispersing a positive electrode active material, a binder, and a metal phosphate in a solvent;
        a positive electrode sheet preparation step of preparing the positive electrode sheet by applying the positive electrode paste to a surface of the positive electrode current collector foil and drying the applied positive electrode paste to form the positive electrode active material layer;
        a construction step of constructing a nonaqueous electrolyte secondary battery by accommodating the nonaqueous electrolytic solution, the positive electrode sheet, and the negative electrode sheet in the battery case; and
        an initial charging step of initially charging the nonaqueous electrolyte secondary battery after the con- struction step, where a film of the metal phosphate is formed on a surface of the positive electrode active material;
wherein the metal phosphate includes a first group of first metal phosphate particles having a first average particle size and a second group of second metal phosphate particles having a second average particle size which is more than the first average particle size by 1.3 µm or more.

2. The method according to claim 1, wherein in the positive electrode paste preparation step, a ratio of the mass of the second metal phosphate to the sum of the mass of the first metal phosphate and the mass of the second metal phosphate is ⅓ or higher.

3. The method according to claim 1, wherein in the positive electrode paste preparation step, a ratio of the mass of the first metal phosphate to the sum of the mass of the first metal phosphate and the mass of the second metal phosphate is ⅙ or higher.

4. The method according to claim 1, wherein in the positive electrode paste preparation step, a particle size corresponding to a cumulative value of 10% from the smallest particle size in a combining particle size distribution, which is obtained by combining a particle size distribution of the first metal phosphate with a particle size distribution of the second metal phosphate, is 0.4 µm or less.

5. The method according to claim 1, wherein the metal phosphate is trilithium phosphate.

* * * * *